Dec. 7, 1954
W. B. ELMER
2,696,357
POLE BRACKET FOR STREET LIGHTING
Filed April 7, 1951
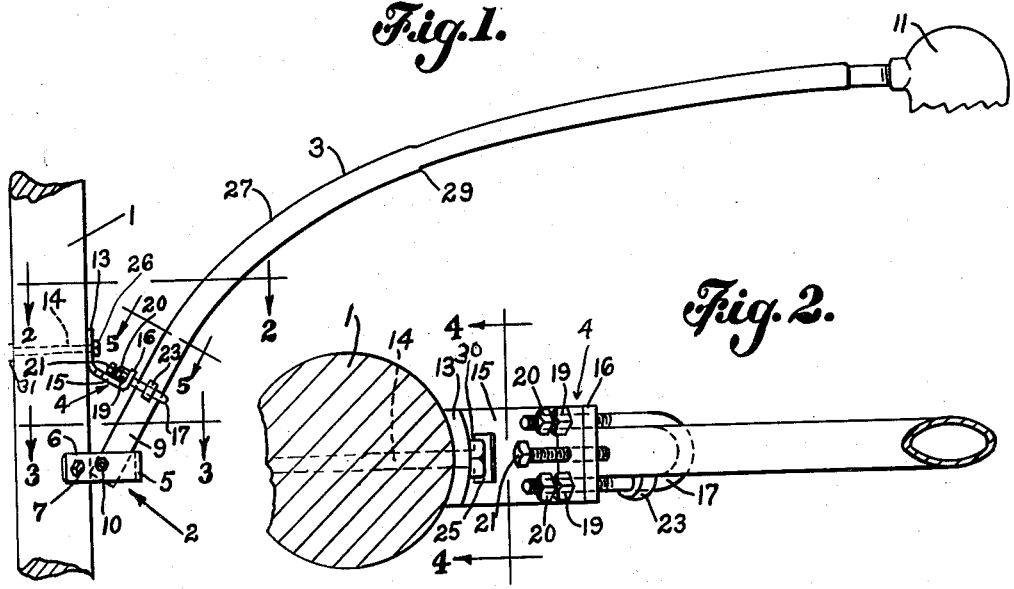
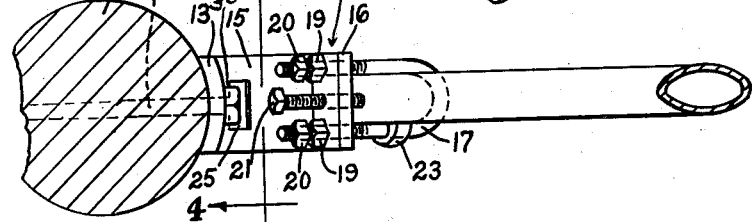
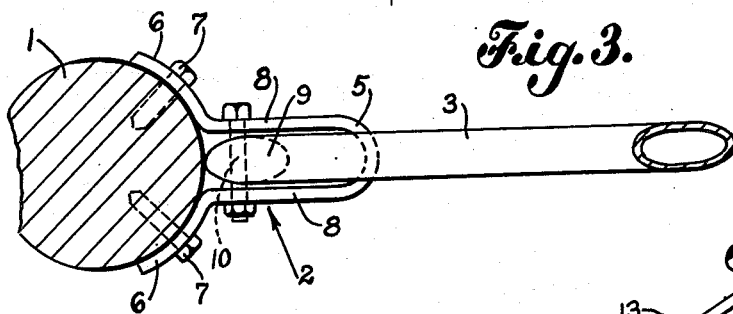
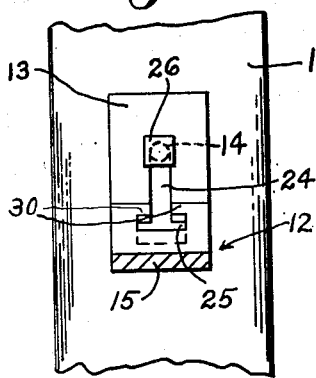
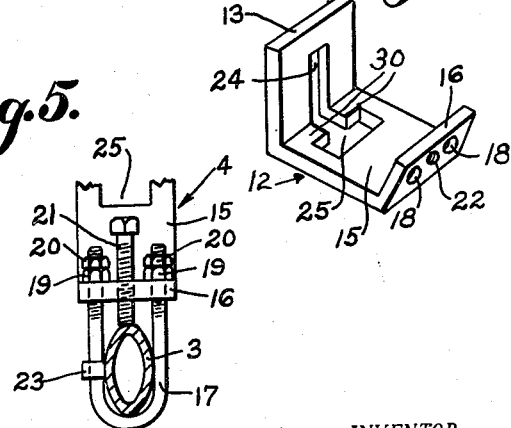
INVENTOR.
William B. Elmer
BY
Louis C. Smith

United States Patent Office 2,696,357
Patented Dec. 7, 1954

2,696,357

POLE BRACKET FOR STREET LIGHTING

William B. Elmer, Boston, Mass., assignor to Wheeler Reflector Company, Boston, Mass., a corporation of Massachusetts Application April 7, 1951, Serial No. 219,840

5 Claims. (Cl. 248—221)

This invention relates to pole brackets such as are used for mounting street lighting fixtures on poles.

One object of the invention is to provide a pole bracket which is equipped with means whereby the bracket arm carrying the luminaire may be adjusted vertically into different angular positions relative to the pole after the bracket has been mounted on the pole for the purpose of properly positioning the luminaire in a vertical direction.

Pole brackets as heretofore used have not been so constructed that there is any provision for adjusting the bracket arm vertically to level up the luminaire after the bracket has once been installed on a pole, and any necessary leveling of the luminaire has had to be done by leveling means located either at the outer end of the bracket arm or within the luminaire itself. While in this practice the luminaire may be properly leveled, yet the bracket arms of successive brackets on a line of poles may be out of line with each other, thereby giving an unsightly appearance to the row of brackets along a street.

With my invention the leveling operation consists in adjusting vertically the bracket arm and the luminaire as a unit so that when the luminaires are all properly leveled or positioned the bracket arms will also be in line with each other.

A further object of the invention is to provide an improved form of pole bracket which requires a minimum vertical pole space for its installation on a pole.

In order to give an understanding of the invention I have illustrated herein a selected embodiment thereof which now will be described, after which the novel features will be pointed out in the appended claims.

In the drawing,

Fig. 1 is a view of a pole bracket embodying my invention, a section of the pole to which the bracket is attached being illustrated.

Fig. 2 is an enlarged section on the line 2—2, Fig. 1.

Fig. 3 is an enlarged section on the line 3—3, Fig. 1.

Fig. 4 is a section on the line 4—4, Fig. 2.

Fig. 5 is an enlarged section on the line 5—5, Fig. 1.

Fig. 6 is a perspective view of the body portion of the arm adjusting member.

In the drawing 1 indicates a pole to which my improved pole bracket is attached.

The pole bracket comprises a bracket support 2 which is secured to the pole 1, a bracket arm 3 which is pivotally mounted at its inner end to the bracket support 2, and an arm-adjusting member 4 by which the bracket arm 3 may be adjusted vertically.

The bracket support 2 is formed with a U-shaped body portion 5, each side of which is formed with an extension 6 that partially embraces the pole 1 and is secured thereto by some suitable means, as for instance lag screws 7.

The U-shaped body portion 5 is of a size to receive the inner end 9 of the bracket arm 3 between the sides 8 thereof, as shown in Fig. 3. The bracket arm 3 is pivotally connected to the bracket support 3 by means of a pivotal bolt 10 which extends through the sides 8 of the U-shaped body 5, and also through the lower end 9 of the bracket arm.

The bracket arm is shown as tubular in construction and it is of the upsweep type, said arm extending upwardly and outwardly from its pivotal point and carrying at its outer end the luminaire, a portion of which is indicated at 11. The arm-adjusting member 4 comprises a body portion 12 having an upstanding inner end section 13 that lies against the surface of the pole and is secured thereto by a suitable bolt 14, and said body portion also presents the downwardly and outwardly inclined section 15 having at its outer end the upturned flange 16. The arm-adjusting member also includes the U-shaped bolt element 17 which embraces the bracket arm 3 and the two ends of which are screw-threaded and extend through openings 18 in the flange 16. Adjusting nuts 19 are screw threaded to ends of the U-bolt 17 and preferably lock nuts 20 will be provided to prevent any undesired loosening of the adjusting nuts 19.

The adjusting or clamping member 4 also includes an adjusting screw 21 which extends through and has screw threaded engagement with a central hole 22 with which the flange 16 is provided. When in use the clamping screw 21 is adjusted to engage the bracket arm 3 and thus hold it tightly clamped in the bight of U-bolt 17, as shown in Fig. 5.

With this construction the bracket arm 3 with the luminaire 11 attached thereto can be adjusted in a vertical direction about its pivot 10 by manipulating the adjusting nuts 19 and the clamping screw 21. If the bracket arm is to be moved upwardly then the adjusting screws 19 will be tightened thereby shortening the overall length of the arm adjusting member 4, this operation resulting in swinging the arm 3 upwardly. When said arm has been adjusted into its desired position the clamping screw 21 may be tightened, thereby locking the bracket arm in its adjusted position.

On the other hand, if the bracket arm is to be lowered then the adjusting nuts 19 will be backed off and the clamping screw 21 tightened, with the result that said arm will be swung downwardly about its pivot 10.

This operation of adjusting the bracket arm vertically can be easily accomplished while the bracket is still attached to the pole 1. Furthermore, the adjusting means is within easy reach of a person as he climbs the pole.

The bracket arm 3 will preferably be provided with means cooperating with the U-bolt 17 to prevent movement thereof lengthwise of the arm and to hold said U-bolt in proper position on the arm. For this purpose there is illustrated a loop 23 which is rigid with the arm 3 and through which one side of the U-bolt extends.

The body portion of the arm-adjusting member 4 is preferably provided with a T-slot presenting a stem portion 24 of a size to receive the through bolt 14 and which is formed partly in the upright pole-engaging section 13 and partly in the inclined section 15, and a larger end portion 25 of a size to receive the head 26 of the bolt which is located in the inclined section 15. One purpose of this T-slot is to facilitate the installation of the bracket on the pole 1. After the through bolt 14 has been placed in the through bolt hole with which the pole has been provided and while the head 26 of the bolt is suitably spaced from the pole, the arm-adjusting member can be dropped into position by passing the head 26 of the bolt 14 through the larger end 25 of the T-slot, and then dropping the member into its position shown in Fig. 4, after which the nut 31 may be screwed onto the projecting end of the bolt and properly tightened.

It will be noted that the T-slot is so formed that the narrow stem portion 24 extends into the section 15 and as a result there is provided shoulders 30 which are situated beneath the head 26 of the bolt 14 when it is tightened. The purpose of this is to provide means for preventing the member 12 from jumping upwardly and thus becoming dislodged from the bolt 14 by the impact resulting from the pole being struck by a truck or automobile.

In order to increase the cantilever strength of the bracket arm I propose to make the inner end portion 27 thereof oval in cross-sectional shape. In Fig. 1 such oval formation extends from the point 29 to the inner end of the arm.

Furthermore, I propose to arrange the pivotal bolt 10 so that it is at one side of the axial line of the bracket arm as clearly shown in Figs. 1 and 3. One purpose of this is to provide added room for the wires or cables leading through the bracket arm to the luminaire. The oval cross-sectional shape of the bracket arm at its pivotal point together with the offset position of the pivot provides ample room within the arm for such wires or cables.

Another advantage of the invention is that a minimum pole space in a vertical direction is required for the attachment of the bracket to the pole. It will be noted that the adjusting member 4 is relatively near to the bracket support 2, so that the vertical pole space required for the attachment of the bracket support 2 and the arm-adjusting member 4 is very small, and the construction is such that no conventional separate bracing member is required.

I claim:

1. Means for adjustably connecting to a pole an upsweep type luminaire-supporting bracket arm which is pivotally connected at its inner end to a bracket support mounted on the pole, said means comprising an extensible and retractile arm-adjusting member presenting a rigid body portion having provision at its inner end for attachment to the pole, and a rigid arm-embracing loop portion adapted to embrace the bracket arm, means for adjusting the loop portion bodily relative to the body portion to vary the overall length of the arm-supporting member and thereby to vary the position of the bracket arm in a vertical direction, and means carried by the body portion and separate from the arm-embracing loop portion to clamp the bracket arm in the loop of said loop portion.

2. Means for adjustably connecting to a pole an upsweep type luminaire-supporting bracket arm which is pivotally mounted at its inner end to a bracket support mounted on the pole, said means comprising an extensible and retractile arm-adjusting member presenting a rigid body portion having provision for rigidly attaching the inner end thereof to the pole, a U-bolt adapted to embrace the bracket arm, and means connecting said U-bolt to the body portion for bodily adjustment thereof relative to said body portion whereby the effective length of the arm-adjusting member can be varied for varying the position of the bracket arm in a vertical direction, and adjustable means carried by the body portion to clamp the bracket arm in the bight of the U-bolt in any adjusted position of the latter.

3. Means for adjustably connecting to a pole an upsweep type luminaire-supporting bracket arm which is pivotally connected at its lower end to a bracket support mounted on the pole, said means comprising an arm-adjusting member including a body portion having at its inner end provision for securing it to the pole, and also having an upturned flange at its outer end, a U-bolt adapted to embrace said bracket arm above its pivotal connection and having its arms screw threaded and extending through said flange, nuts screw threaded to said arms and engaging said flange for adjusting the U-bolt bodily relative to the body portion thereby to vary the overall length of the arm-adjusting member and thus vary the position of the bracket arm in a vertical direction, and a clamping screw screw-threaded through said flange and engaging said bracket arm, thereby clamping it against the bight of the U-bolt.

4. Means for adjustably connecting to a pole an upsweep type luminaire-supporting bracket arm, said means comprising a bracket support adapted to be secured to a pole, means pivotally connecting the inner end of said bracket arm to said bracket support, an arm adjusting member including a rigid body portion having at its inner end an upstanding pole-engaging section, an inclined central section and an upturned flange at its outer end and a U-bolt adapted to embrace said bracket arm and having its arms screw threaded and extending through said flange, nuts screw threaded to said arms and engaging said flange for adjusting the U-bolt bodily relative to the body portion thereby to vary the overall length of the arm-adjusting member, said body portion having a T-slot, the larger portion of which is in said central inclined section and the stem portion of which is partially in said inclined section and partially in the upstanding pole-engaging section, and a bolt extending through said slot and adapted to extend through a pole for rigidly securing the body portion to the pole, said larger portion of the T-slot being of a size to permit the head of the bolt to pass therethrough.

5. A pole bracket comprising a bracket support adapted to be attached to a pole, a tubular luminaire-supporting bracket arm, the inner end of which has an oval cross sectional shape with the long axis of the oval shape lying in the vertical plane of said bracket arm, a pivotal bolt extending transversely through the bracket support and the oval end of the bracket arm at a point near the inner end of the long axis of the oval shape, thereby pivotally connecting the bracket arm to the bracket support, an extensible and retractile arm-adjusting member connected at one end to said arm and adapted to be connected at the other end to a pole at a point above the bracket support, the location of pivotal bolt providing increased available wire-receiving space at the inner end of the bracket arm for the reception of circuit wires which extend through said arm.

References Cited in the file of this patent

UNITED STATES PATENTS

| Number | Name | Date |
|---|---|---|
| 465,365 | Duggan | Dec. 15, 1891 |
| 559,066 | Shickluna | Apr. 28, 1896 |
| 1,387,363 | De Fore | Aug. 9, 1921 |
| 1,754,082 | Chase | Apr. 8, 1930 |
| 1,781,372 | Denecke | Nov. 11, 1930 |
| 2,280,476 | Calvert | Apr. 21, 1942 |
| 2,540,784 | Hocher | Feb. 6, 1951 |

FOREIGN PATENTS

| Number | Country | Date |
|---|---|---|
| 326,895 | Great Britain | Mar. 27, 1930 |